United States Patent [19]

Swart

[11] 4,441,122
[45] Apr. 3, 1984

[54] BEAM CURRENT CONTROL FOR TELEVISION CAMERA

[75] Inventor: Louis M. Swart, Eindhoven, Netherlands

[73] Assignee: U.S. Philips Corporation, New York, N.Y.

[21] Appl. No.: 340,164

[22] Filed: Jan. 18, 1982

[30] Foreign Application Priority Data

Feb. 9, 1981 [NL] Netherlands .................. 8100600

[51] Int. Cl.³ .................................. H04N 5/34
[52] U.S. Cl. ........................ 358/41; 358/219
[58] Field of Search ............ 358/41, 218, 219, 209, 358/217, 222, 223

[56] References Cited

U.S. PATENT DOCUMENTS

| | | | |
|---|---|---|---|
| 2,174,580 | 10/1939 | Hergenrother | 358/218 |
| 2,396,023 | 3/1946 | Schantz | 358/218 |
| 2,571,306 | 10/1951 | Szegho | 358/218 |
| 3,708,617 | 1/1973 | Caraba | 358/219 |
| 3,831,056 | 8/1974 | Bazin | 358/219 |
| 3,931,466 | 1/1976 | Van Den Berg | 358/218 |
| 4,037,133 | 7/1977 | Sennik | 358/218 |
| 4,161,755 | 7/1979 | Haendle | 358/219 |

*Primary Examiner*—Michael A. Masinick
*Attorney, Agent, or Firm*—Thomas A. Briody; William J. Streeter

[57] ABSTRACT

A television camera comprising a control circuit for controlling the electron beam current intensity in a pick-up tube which has a current-controlled electron gun, for example a diode gun. The control circuit comprises a controllable current source an output of which is connected to the anode of the diode gun, which anode acts as a control electrode, and a control input of which is coupled to a pick-up tube output for producing a picture signal. In order to obtain a dynamic additional focussing of the electron beam when an electrostatic focussing means is employed the cathode of the electron gun is connected to a voltage source via a, for example, variable resistor.

3 Claims, 1 Drawing Figure

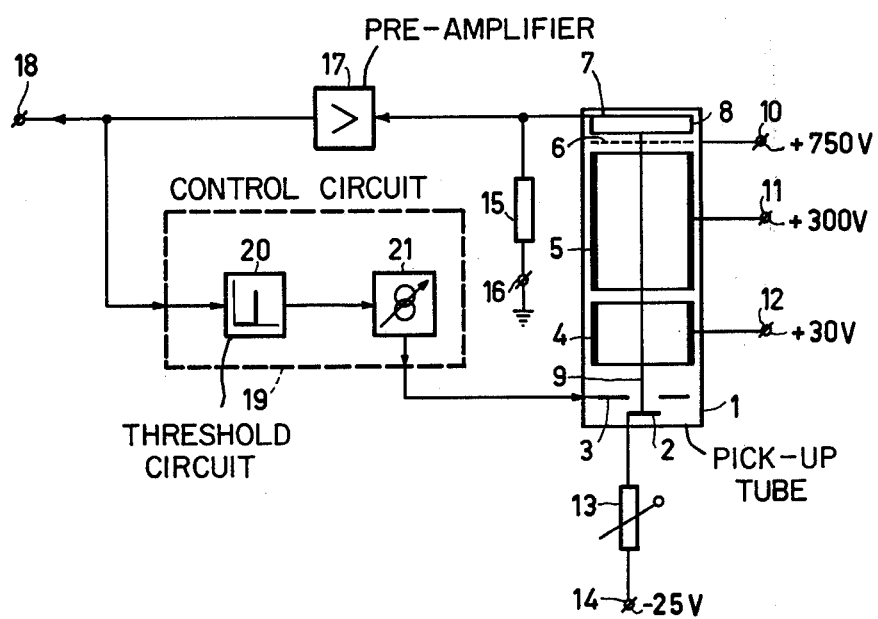

BEAM CURRENT CONTROL FOR TELEVISION CAMERA

The invention relates to a television camera comprising a control circuit for controlling the electron beam current intensity in at least one pick-up tube, the pick-up tube comprising a current-controlled electron gun having at least a cathode connected to a voltage terminal and a control electrode, the control circuit having a controllable current source an output of which is connected to the control electrode and a control input of which is coupled to a pick-up tube output for producing a picture signal.

Such a television camera is disclosed in Netherlands Patent Application No. 8001703 in which the control circuit provides a higher beam current intensity at an increased picture signal value, particularly after the picture signal has exceeded a signal threshold. The control circuit is then active at a pick-up tube which comprises an electron gun in the form of a diode, the control electrode forming the anode of the diode. Besides the implementation of the current-controlled electron gun as a diode thoughts might further go towards an implementation in the form of a triode, the control electrode forming the grid of the triode and the triode gun for the generation of the electron beam being set to a state in which the grid carries current. Independent of the specific construction of the current-controlled electron gun it holds that compared with voltage-controlled electron guns it has the advantage that the control circuit which is included in a positive feed-back circuit has a stabler operation. There is, namely, a substantially linear relationship between the intensity of the control current the control electrode carries and the intensity of the electron beam produced by the gun; this is in contrast with the non-linear relationship between a control voltage for the control electrode of a voltage-controlled gun and the intensity of the electron beam produced, which increases the risk of oscillations in the positive feed-back circuit.

Irrespective of the fact whether a current or a voltage-controlled electron gun is used, there is the problem that a dynamically increased beam current strength is accompanied by a defocussing effect at the electron beam. Said defocussing on recording may on display appear as annoying stripes in the displayed picture. The effect of defocussing is less noticeable when electromagnetic focussing is used at the pick-up tube than when electrostatic focussing is used at the pick-up tube.

SUMMARY OF THE INVENTION

The invention has for its object to provide a television camera in which an increase of the dynamic beam current intensity is not accompanied by an annoying defocussing effect. A television camera according to the invention is therefore characterized in that when an electrostatic focussing means is employed at the pick-up tube the cathode of the electron gun is connected to the voltage terminal via a resistor.

The invention is based on the recognition of the fact that when a current-controlled electron gun and an electrostatic focussing means is employed in the pick-up tube, defocussing can be compensated for in a simple way by having the controlled current flowing through the cathode act on the cathode voltage and consequently on the voltage of the electron beam. This is effected by means of a resistor in the cathode lead. The cathode voltage variation in dependence on the beam current intensity variation changes in a dynamic manner the intensity of the electrostatic focussing in such a way that the defocussing effect is compensated for. A dynamic additional focussing occurs.

A television camera in which the defocussing compensation can be adapted to the specific tube parameters which are different for each pick-up tube within certain limits, is characterized in that the said resistor is in the form of a variable resistor.

In practice it then appears that there is a sufficiently wide adjusting range for the resistor for a television camera which is characterized in that the variable resistor is adjustable between approximately 50 Ohm and approximately 2000 Ohm.

It should be noted that it is known per se to include a resistor in the cathode lead of an electron gun, as described in, for example, Netherlands Patent Application No. 74 06746 (FIG. 3). Therein, the electron gun is however a voltage-controlled gun and no details are given about the manner of focusing. In contrast therewith, it is essential to the present application that a current-controlled electron gun and electrostatic focussing are used in conjunction, the resistor compensating for defocusing.

The invention will now be further explained by way of non-limitative example with reference to the accompanying drawing.

BRIEF DESCRIPTION OF THE DRAWING

The drawing is a block diagram of a television camera in accordance with the invention.

DESCRIPTION OF THE PREFERRED EMBODIMENT

In the drawing, reference numeral 1 denotes a television pick-up tube. Of the pick-up tube 1 only those components are shown which are relevant to the description of the invention. A cathode 2, a control electrode 3, a focussing electrode 4, an anode electrode 5, a mesh electrode 6, a transparent signal electrode 7 and a semi-conductor layer 8 provided thereon are shown in the pick-up tube 1. The cathode 2 and the control electrode 3 form an electron gun (2, 3) which is, for example, in the form of a diode gun, the control electrode 3 constituting the anode of the diode. The electron gun (2, 3) produces an electron beam denoted by 9. In combination with the anode electrode 5, the focussing electrode 4 forms a focussing means (4, 5), which constitutes a focussing lens between the said electrodes, this focussing lens being active for the electron beam 9. Under the control of deflection means, not shown, the electron beam 9 scans the layer 8 line and field-sequentially in a manner which is customary in television, causing a potential image formed on said layer 8 and which corresponds to a scene to be recorded to be converted into a picture signal which is obtained from the signal electrode 7.

By way of example, the mesh electrode 6 is connected in the drawing to a voltage terminal 10 at which a voltage of +750 V is present. The anode electrode 5 is connected to a voltage terminal 11 which carries a voltage of +300 V. The focussing electrode 4 is connected to a voltage terminal 12, which carries a voltage of +30 V. In accordance with one aspect of the invention the cathode 2 is connected via a variable resistor 13 to a voltage terminal 14, which carries a voltage equal to, for example, −25 V. Via a resistor 15 the signal electrode 7 is connected to a voltage terminal 16, which is connected to ground. The said voltages are given by way of example and may be obtained from a voltage source, not shown. Instead of the terminal 16 being connected to ground and the terminal 14 to the negative voltage, it is alternatively possible to connect the terminal 14 to ground and the terminal 16 to a positive voltage, the terminals 10, 11 and 12 carrying matched voltages.

The picture signal generated by the pick-up tube 1 and available across the resistor 15 is applied to a preamplifier 17. The amplifier 17 applies the amplified picture signal to an output terminal 18. The picture signal present on the terminal 18 may be processed in the television camera in a customary manner, not further described. The output of the amplifier 17 is further connected to a control circuit 19 and is connected therein to the input of a threshold circuit 20. The output of the threshold circuit 20 is connected to a control input of a controllable current source 21. The current source 21 has an output which is connected to the control electrode 3.

The control circuit 19 is included in a positive feedback circuit (1, 17, 19) which further comprises the pick-up tube 1 and the amplifier 17. In the feed-back circuit (1, 17, 19) the control circuit 19 provides that, starting from an optimum current intensity of the electron beam 9 for normal brightness conditions, this current intensity is instantaneously increased when the picture signal exceeds the threshold value of the threshold circuit 20, owing to a locally considerably increased brightness. In this situation there is a linear relationship between the instantaneous increase of the picture value and the beam current intensity. The dynamic beam control obtained prevents the occurrence of comet tails behind bright, moving portions of the picture.

In a colour television camera having several pick-up tubes it is possible to use one single control circuit 19 for all tubes, the input signal for the control circuit 19 being derived from that pick-up tube which produces the picture signal having the highest instantaneous value.

The threshold circuit 20 may be omitted from the control circuit 19, the only essential measure being the provision of the controllable current source 21 which, by means of its control input, is coupled to the output of the pick-up tube 1 to furnish the picture signal. An additional essential measure is that the electron gun (2, 3) operates as a current-controlled electron gun and for that purpose may, for example, be in the form of a diode gun or a triode gun the grid of which is set to a current-carrying state. A further essential measure is that the pick-up tube 1 is provided with an electrostatic focussing means (4, 5).

Without the provision in accordance with the invention of the resistor 13 it appears in practice that on display of the picture signal generated by the pick-up tube 1 bright, moving portions in the picture are followed by stripes and have frayed ends. It is recognized that the picture disturbance is produced by the defocussing occurring at the dynamically increased beam current intensity. This defocussing results in an impermisslbe reduction in the picture quality when electrostatic focussing is employed.

In accordance with the invention, the defocussing can be compensated for by providing the resistor 13 in the cathode lead (2, 13, 14). This can be explained as follows. Let it be assumed that when the control circuit 19 does not produce a control signal the pick-up tube 1 is adjusted so that when the beam current (9) has an intensity of 200 nA the picture signal for the what is commonly referred to as peak-white value corresponds to 100 nA and the current through the resistor 13, which has a resistance of, for example, 125 Ohm, amounts to 4 mA. The cathode 2 carries a voltage equal to −24.5 V. The electrodes 4 and 5, having the respective voltages +30 V and +300 V, act on the electron beam 9, which is produced by the cathode 2 with a voltage equal to −24.5 V. The focussing lens is formed between the electrodes 4 and 5, the intensity of the focussing action being related to the quotient of the voltage differences between the electron beam 9 and the electrodes 5 and 4, respectively. For this example it follows that 324.5:54.5=5.954. This quotient is a measure of the power of the focussing lens and at a higher and lower value, respectively a stronger and weaker focussing, respectively occurs.

Let it further be assumed that the control circuit 19 supplies the maximum current at which a 600 nA beam current (9) occurs which then corresponds to the peak-white value for the picture signal, while the resistor 13 (125 Ohm) carries a current equal to 12 mA. The cathode 2 has a voltage equal to −23.5 V. The effect on the focussing lens is now that relative to the electrodes 4 (+V) and 5 (+300 V) it corresponds to a quotient equal to 323.5:53.5=6.047. It appears that the provision of the resistor 13 increases the focussing (a dynamic additional focussing occurs), so that the defocussing which automatically results from the increased beam current intensity is compensated for by the dynamic additional focussing.

The optimum value of the resistor 13 must be matched to the properties resulting from the specific construction of the pick-up tube 1. With a given construction of the pick-up tube 1 different parameters occur for the several tubes, which parameters are located within given tolerance limits. It is therefore advantageous to use a variable resistor 13, so that an optimum adjustment of the dynamic additional focussing can be achieved for each individual pick-up tube 1. In the foregoing it was assumed that the resistor 13 was adjusted to a resistance value of 125 Ohm, which is accompanied by a variation of the cathode voltage equal to 1 V (4 with respect to 12 mA current). Starting from possible constructions for pick-up tubes (1), approximately 50 Ohm is mentioned as the lowest value for the resistor and approximately 2000 Ohm as the highest value. Using a variable resistor 13 which is adjustable between approximately 50 and 2000 Ohm ensures that an optimum adjustment of the dynamic additional focussing can be achieved, independent of the specific tube construction.

What is claimed is:

1. A television camera comprising a control circuit for controlling the electron beam current intensity in at least one pick-up tube of said camera, the pick-up tube comprising a current-controlled electron gun having at least a cathode connected to a voltage terminal and a control electrode, the control circuit having a controllable current source an output of which is connected to the control electrode and a control input of which is coupled to a pick-up tube output for producing a picture signal, wherein an electrostatic focussing means is employed at the pick-up tube and the cathode of the electron gun is connected to the voltage terminal via a resistor.

2. A television camera as claimed in claim 1, wherein said resistor is in the form of a variable resistor.

3. A television camera as claimed in claim 2, wherein the variable resistor is adjustable between approximately 50 Ohm and approximately 2000 Ohm.

* * * * *